P. MUELLER AND A. C. SCHUERMANN.
ELASTIC VALVE STEM.
APPLICATION FILED AUG. 27, 1919.

1,394,756.

Patented Oct. 25, 1921.

Witnesses

Inventor

UNITED STATES PATENT OFFICE.

PHILIP MUELLER AND ANTON C. SCHUERMANN, OF DECATUR, ILLINOIS, ASSIGNORS TO ADOLPH MUELLER, TRUSTEE, OF DECATUR, ILLINOIS.

ELASTIC-VALVE STEM.

1,394,756.  Specification of Letters Patent.  Patented Oct. 25, 1921.

Application filed August 27, 1919. Serial No. 320,256.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Elastic-Valve Stems, of which the following is a specification.

This invention relates to cocks or faucets, and has as its objects to provide a cock or faucet with means for prolonging the life of the elastic valve-head or ball, and to compensate for wearing of the parts and thus obtain a perfect closing at each operation of the valve.

Between the valve and the means for operating the same is interposed a resilient or yielding connection which is adapted to absorb or take-up part of the strain which is present when the valve is brought into closed position, and thus the head or elastic ball is partially relieved of the strain to which it would be otherwise subjected, and cutting or crushing of the same when brought against its seat is prevented. The resilient connection is adapted to force the valve-head against its seat upon every closing of the valve with the proper amount of pressure, and, thus, when the valve has been in operation for some time, and the parts have become partly worn, leakage of water past the valve will not take place.

The above and other objects of this invention are obtained in the structure described in the following specification, and illustrated in the accompanying drawing, wherein—

Figure 1:
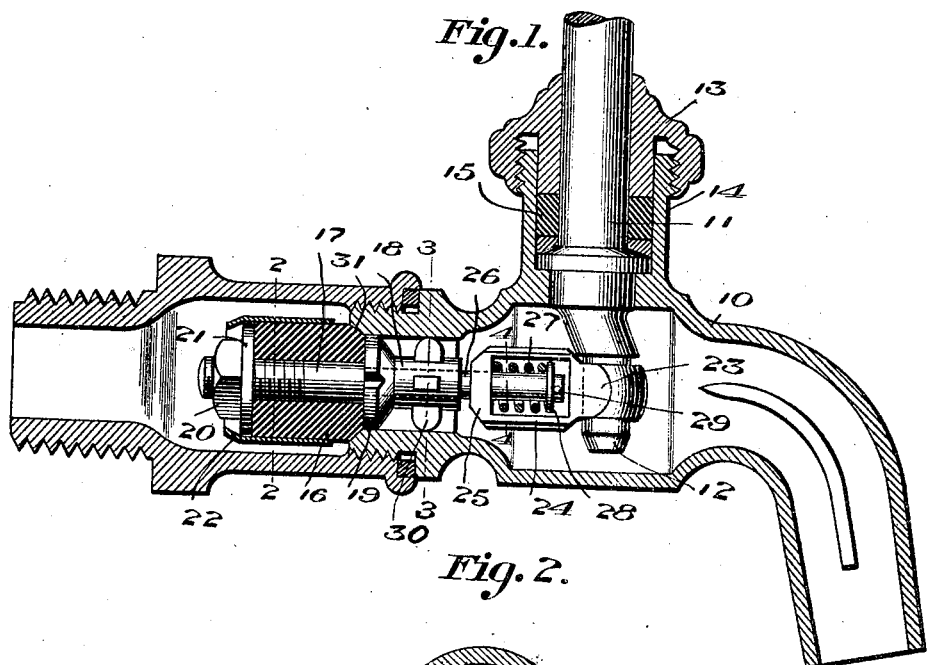

Figure 1 is a longitudinal vertical section through a basin cock or faucet showing our improvement applied thereto.

Figure 2:
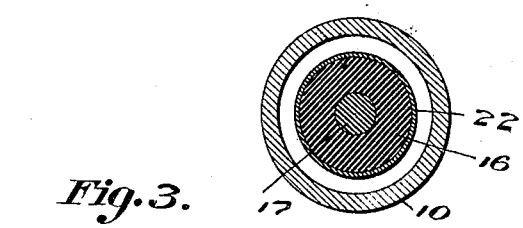
Figure 3:
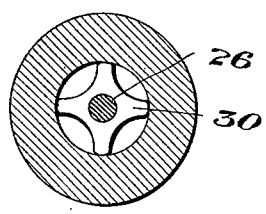
Figure 4:
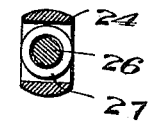

Figs. 2, 3 and 4 are cross-sectional views taken on lines 2—2, 3—3, and 4—4, respectively, Fig. 1.

Referring to the accompanying drawing, wherein like characters represent like parts in the several views, 10 designates a cock or faucet body of any suitable construction, and illustrated in the drawings as having an eccentric stem 11 provided at its upper end with an operating handle (not shown) for turning the same, and at its lower end an eccentric or crank portion 12. The eccentric stem is retained in place in the body by means of a cap 13 screw-threaded to the neck portion 14, and bearing at its lower end against suitable packing rings or washers 15 which provide a fluid-tight joint about the eccentric stem.

The eccentric stem when rotated is adapted to move an elastic valve or ball to and from its seat, and, of course, any suitable construction of elastic ball may be adopted, and the specific form disclosed is shown by way of illustration only. The ball illustrated in the drawings comprises a cylindrical elastic body 16 mounted upon the rear end 17 of the valve stem 18, and retained in place upon the valve stem and against an abutting collar 19 by means of a nut 20 screw-threaded upon the end of the valve stem and engaging a collar 21 bearing against the rear end of the elastic ball. In the present instance, we have shown the elastic body as surrounded or encircled by a protecting shell 22 which is cylindrical in form conforming to the shape of the elastic ball, so as to snugly fit the same and having its rear end or edge crimped inwardly so as to prevent the protecting ring from riding forwardly on the elastic ball and cutting the valve seat. The protecting ring 22 aids in retaining the initial resiliency and normal shape of the ball and prevents deterioration and permanent distortion thereof.

The valve stem is connected to the crank or eccentric 12 by means of an eccentric strap 23 which has preferably formed integral therewith a stirrup 24 having the cross-bar 25 centrally apertured for the reception of the reduced forward end 26 of the valve stem 18. The stirrup may be constructed in any suitable manner, but, in the present instance, it is formed by making a rectangular opening transversely through a substantially cylindrical member connected to the eccentric strap 23. The stirrup serves as a chamber for a coiled spring 27 which abuts at one end against the cross-bar 25. The forward end 26 of the valve stem is adapted to extend through the central opening in the cross-bar 25 of the stirrup, into the lateral opening of the stirrup, and through the coiled spring 27, and it is prevented from being withdrawn from the spring by a retaining washer or ring 28 held in place upon the forward end of the stem by a pin 29 passing through a diametrical opening in the stem. The valve stem, intermediate its reduced end portions, has wings or guides 30, the tips of which are adapted to engage the internal wall of the cock shank for guiding and retaining the ball in correct position relative to its valve seat 31 provided upon the rear end of the cock body 10.

It will be readily seen that when the eccentric stem 11 is turned in a direction to open the valve, the forward end of the valve stem will be engaged by the end wall of the lateral opening in the stirrup, and the ball will be moved positively away from its seat 31. When the eccentric stem is turned in a direction to close the valve, the eccentric strap together with the stirrup moves to the right, referring to Fig. 1, and the ball is brought into contact with its seat. After the valve is seated, and on continued movement of the eccentric stem, the spring within the stirrup is compressed between the cross-bar 25 and the washer or ring 28, and the spring takes up part of the strain exerted. Thus undue pressure upon the valve is prevented, although the handle of the cock may be turned to full cut-off position, and the ball will not be crushed or cut when it is brought against the seat. The ball is yieldingly held against the seat due to the spring 25 and the force of the spring may be such that should any of the parts become slightly worn, it would take up or compensate for such wear, and the valve would engage its seat with sufficient pressure to prevent leakage of water there past.

It is, of course, obvious that our invention is susceptible of various modifications and changes, but we do not wish to limit ourselves to the particular embodiment herein illustrated and described unless so limited by the following claims.

What is claimed is:—

1. In a cock or faucet of the Fuller ball type, the combination of a body having a valve seat, an elastic ball valve, a valve operating eccentric, a two-part connection between said eccentric and said valve, and a resilient coupling between the two parts of said connection.

2. In a cock or faucet of the Fuller ball type, the combination of a cock body having a valve seat, an elastic ball valve, a valve operating eccentric, and a resilient connection between said eccentric and said valve.

3. In a cock or faucet of the Fuller ball type, the combination of a cock body having a valve seat, an elastic ball valve, an eccentric valve operating stem, an eccentric strap on said stem, a telescope connection between said valve and strap, and a spring in said connection to permit said valve to be brought yieldingly against its seat.

4. In a cock or faucet of the Fuller ball type, a cock body having a valve seat, an elastic ball valve, an eccentric valve operating stem, an eccentric strap having a stirrup on said stem, a ball valve connection extending into said stirrup, a spring mounted in said stirrup and engaging said valve connection, and means for preventing the withdrawal of said valve connection from said spring.

5. In a cock or faucet of the Fuller ball type, the combination of a cock body having a valve seat, an elastic ball valve, a valve operating stem adapted to move said valve to and from its seat, and a resilient coupling between said ball and said operating stem to permit said valve to be drawn yieldingly to its seat.

In testimony whereof we have hereunto set our hand.

PHILIP MUELLER.
ANTON C. SCHUERMANN.